March 26, 1935.                    H. CLARK                    1,995,880
                                VEHICLE BRAKE
                        Filed March 16, 1932           2 Sheets-Sheet 1

INVENTOR.
Herbert Clark
BY Jerome R. Cox
ATTORNEY.

March 26, 1935.  H. CLARK  1,995,880
VEHICLE BRAKE
Filed March 16, 1932  2 Sheets-Sheet 2
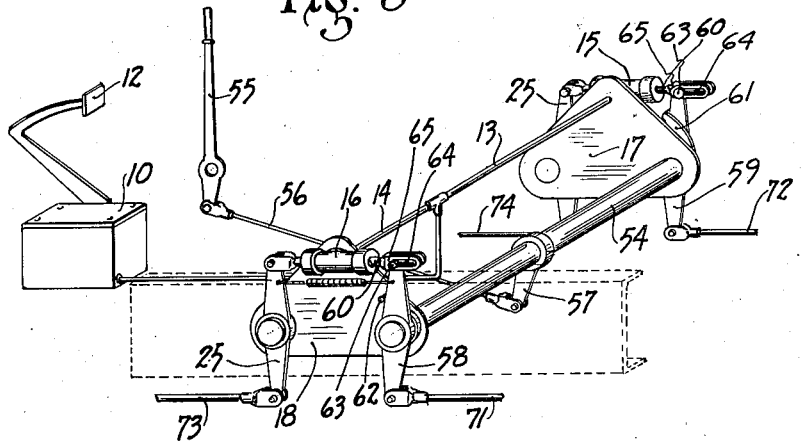
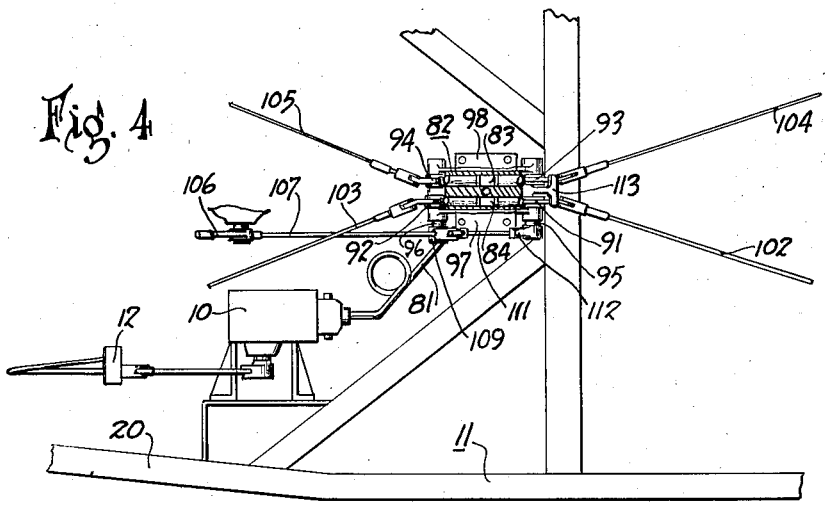
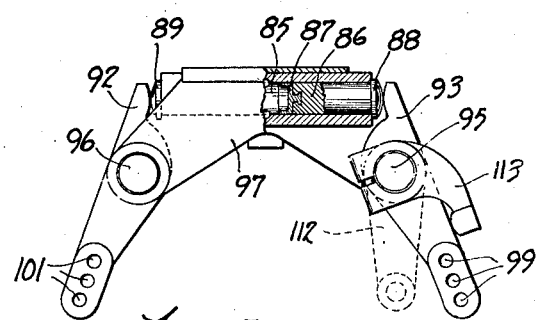

Patented Mar. 26, 1935

1,995,880

UNITED STATES PATENT OFFICE 1,995,880

VEHICLE BRAKE

Herbert Clark, Tyseley, Birmingham, England, assignor to Bendix Aviation Corporation, South Bend, Ind., a corporation of Delaware Application March 16, 1932, Serial No. 599,288
In Great Britain April 14, 1931

1 Claim. (Cl. 188—152)

This invention relates to improvements in vehicle brakes and refers particularly to brakes of the type in which pressure applied to a fluid in a master cylinder is transmitted hydraulically to the brake shoes to apply the brakes.

Usually heretofore the master cylinder has been connected by a combination of rigid and flexible tubing to operating cylinders located in brake drums.

One object of my invention is to combine the automatic compensation and other advantages of hydraulically operated brakes with the accessibility and reliability of mechanically operated brakes.

Another object is to reduce the length of piping under hydraulic pressure and to eliminate the use of flexible tubing under pressure.

A further object is to remove the operating cylinders from the brake drums where they are exposed to the heat generated in the drums to a point or points where they are kept cool and where they are readily accessible for bleeding air from the system.

A further object is to enable the relative braking effect applied to the front and rear wheels of a vehicle to be varied, which has hitherto been difficult to attain with hydraulic operation.

According to my invention, pressure applied through a pedal or the like to fluid in a master cylinder is transmitted hydraulically to operating cylinders located at a convenient point or points on the vehicle frame. Pistons working in these cylinders act through levers on cables or rods which actuate the brake shoes in the ordinary mechanical way. Automatic compensation of the brakes is thus obtained hydraulically. However, by employing levers of different lengths for actuating the front and rear brakes any desired relative braking effect on the front and rear wheels can be obtained.

Mechanical means operated by a hand lever or the like are also preferably provided for applying the brake shoes on the rear or front wheels or on both. The mechanical means thus serve for holding the vehicle stationary and also as a safeguard in the event of a failure of the hydraulic system. These mechanical means preferably act directly on the levers which are normally actuated by the hydraulic cylinders to apply the brakes, so that separate mechanical operating mechanism extending to the brake shoes is avoided and the layout is simplified and cheapened.

Several practical forms of brake operating mechanism in accordance with my invention are illustrated diagrammatically by way of example in the accompanying drawings, in which:

Figure 3 is a diagrammatic perspective view showing an alternative arrangement;

Figure 4 is a fragmentary view showing another alternative arrangement;

Figure 5 is a fragmentary elevation on an enlarged scale showing in detail one of the operating cylinders of the arrangement of Figure 4.

Figure 1:
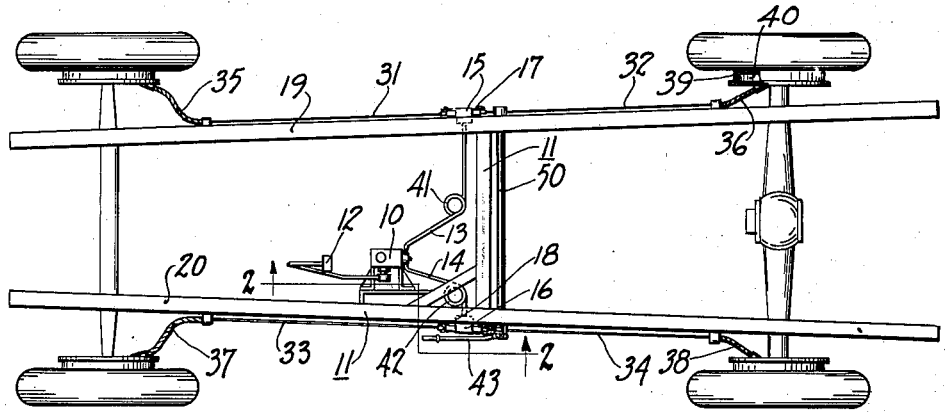
Figure 1 is a plan view of a mechanism showing a general arrangement.
Figure 2:
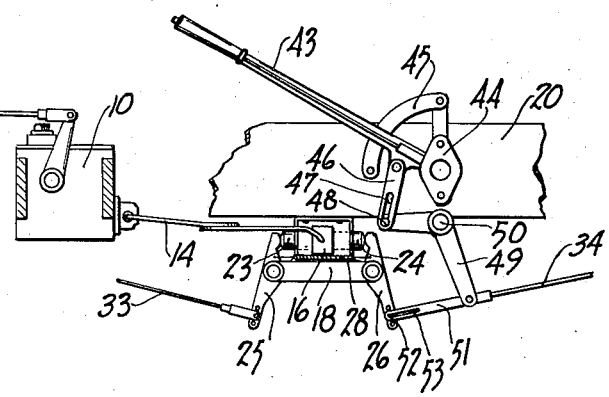
Figure 2 is a side elevation.
Figure 6:
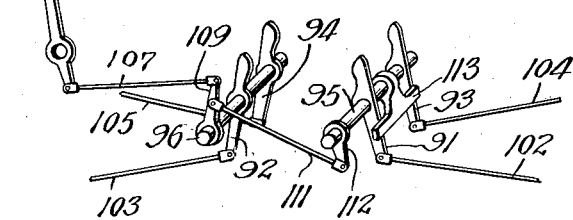
Figure 6 is a fragmentary perspective view showing a part of the structure of Figure 4 on a larger scale.

In Figures 1 and 2 of the drawings, 10 is a master cylinder rigidly mounted on a vehicle frame 11 at a convenient point and containing a piston to which pressure can be applied by a brake pedal 12 in the ordinary way. The master cylinder is connected by rigid piping 13 and 14 to two operating cylinders 15 and 16 mounted on brackets 17 and 18 on opposite sides 19 and 20 of the frame 11 intermediate of its length. Each of the cylinders 15 and 16 contains two opposed pistons between which fluid is forced when pressure is applied to the piston in the master cylinder 10 and piston rods such as 23 and 24 are connected to the pistons and extend through opposite ends of the cylinder. The piston rods bear against the upper ends of opposed rocking levers such as 25 and 26, the levers being pivotally mounted on the brackets 17 and 18 secured to the frame 11.

Tension springs such as 28 connect the levers above their pivots, to hold the pistons normally in the retracted position, and the lower ends of the levers have attached to them cables 31, 32, 33, and 34 by which the brakes on the front and rear wheels respectively are operated. The cables are shown as being guided in tubular casings 35, 36, 37, and 38 but any other method of guiding the cables may be employed, and they may operate any type of brake adapted for mechanical operation. For example, I have shown the vehicle equipped with drums such as 39 in which there are carried brake shoes such as 40. Rods and levers may, if desired, be employed instead of cables.

The two operating cylinders replace the four operating cylinders in the ordinary hydraulic brake-gear, and may be made considerably larger and may work at lower pressure, than the ordinary cylinders. They can be mounted on the outside of the main frame member for adjustment or repair, and for the routine operation of bleeding air from the system. One or more coils such as 41 and 42 may be formed in the pipes 13 and 14 to prevent risk of breakage of the pipes through vibration, but as the master cylinder and operating cylinder are all mounted on the frame, there is no need to introduce any flexible piping into the system. If it is desired to have different relative braking efforts applied to the front and rear brakes of the vehicle, this can be accomplished very simply by varying the length of the levers 25 with respect to the length of the levers 26 and thus using levers of different lengths for actuating the front and rear brakes. The stroke of one piston in the operating cylinder will then be greater than the other, but this is immaterial, as the force applied to the two pistons by the fluid will be the same, and the difference in the applied braking effort will be directly proportional to the difference in the leverage through which the pistons act.

To hold the vehicle stationary and also as a safeguard in the event of any failure of the hydraulic system, means are illustrated in Figures 1 and 2 for applying the rear brakes mechanically.

A hand lever 43 pivoted on a bracket 44 on the frame, and provided with an arcuate ratchet 45 carries a pivoted link 46 having a longitudinal slot 47 in which works a pin 48 secured in one arm of a bell-crank 49 which is mounted on a crossshaft 50. The other end of the bell crank 49 is pivotally connected to a coupling 51 interposed between the cable 34 for the rear brake and its lever 26. The coupling 51 is connected to the lever 26 by a pin 52 secured in one of a plurality of holes in the lever, and working in a slot 53 formed in the coupling.

The operation of the mechanism will be readily followed. When the brake pedal 12 is depressed, pressure is applied to the fluid in the master cylinder 10 and is transmitted hydraulically with equal pressure to the two operating cylinders 15 and 16. The pistons in these cylinders are forced outwardly, and the levers 25, 26, and the corresponding levers on the opposite side are rocked to tension the cables and apply the brakes.

When the hand lever 43 is operated, the bellcranks 49 are rocked and the couplings 51 are drawn forwardly to apply the brakes, the slots 53 allowing this movement to take place without movement of the levers 26. When the brakes are applied in the ordinary way by the pedal, the slot 47 in the link 46 permits the movement of the coupling and bell-crank to take place without affecting the hand-lever.

This forms a very convenient arrangement and avoids the expense and complication of separate mechanical operating mechanism extending to the brake shoes.

The arrangement illustrated in Figure 3 differs only in detail from that described above. In this case, the levers 58 and 59 by which the rear brakes are operated are rotatably mounted on the ends of a rotatable transverse shaft 54. The shaft 54 is capable of being rocked by the hand lever 55 through a rod 56 and a lever 57 secured to the shaft 54. As stated, levers 58 and 59 are rotatably mounted on the ends of the shaft 54 but (when the shaft is rotated by the hand lever,) are engaged by lugs on arms 61 and 62 secured on the shaft so that the brakes may be applied by the hand lever but no movement of the shaft takes place when the brakes are applied through the hydraulic mechanism.

To avoid movement of the hydraulic mechanism when the brakes are applied mechanically, the upper ends of the levers 58 and 59 are connected to the piston rods 60 by pins 63, working in slots 64 in heads 65 on the outer end of the piston rods.

The lower ends of both levers 58 and 59 are pivotally connected to rods 71 and 72 by which they are coupled to the rear brakes, and the lower ends of the levers 25 are connected by rods 73 and 74 to the front brakes.

The operation of the mechanism shown in Figure 3 is similar to the operation of the mechanism shown in Figures 1 and 2. When the brake pedal 12 is depressed, the pressure is applied to the fluid in the master cylinder 10 and is transmitted hydraulically with equal pressure to the two operating cylinders 15 and 16. The pistons in these cylinders are forced outwardly and the levers 25, 58, and 59 are rocked to tension the rods 71, 72, 73, and 74 and apply the brakes. When the hand lever 55 is operated, the rock shaft 54 is rocked and the levers 58 and 59 are turned through the arms 61 and 62, the pins 63 working in the slots 64. When the brakes are applied in the ordinary way by the pedal, the levers 58 and 59 move away from the lugs on the ends of the arms 61 and 62.

The arrangement illustrated in Figures 4 and 5 also differs only slightly from that described above. In this case, the master cylinder 10 is connected through rigid piping 81 with the double cylinder 82. The double cylinder 82 comprises a pair of cylinders 83 and 84 each of which is formed with an internal bore such as 85 and is provided with a pair of pistons such as 86 each having a cup packing such as 87. The outer end of each of the pistons is provided with a thrust button or cap such as 88 and 89 which bear against the upper ends of levers 91, 92, 93, and 94 pivoted on shafts 95 and 96 mounted in bearings on brackets 97 and 98. The lower ends of the levers 91, 92, 93, and 94 are each formed with a plurality of openings such as 99 and 101 by means of which the levers 91, 92, 93, and 94 are adjustably connected with links or rods 102, 103, 104, and 105 respectively. The rods 102 and 104 are coupled to the rear brakes and the rods 103 and 105 are coupled to the forward brakes.

A hand lever 106 has its lower end connected to a rod 107 which extends rearwardly and is connected at its rear end to a lever 109 pivoted on the shaft 96. A link 111 has its forward end connected to the lever 109 and its rear end connected to a lever arm 112 secured to the shaft 95. A T-shaped arm 113 is also secured to the shaft 95 and has its cross member adapted to bear upon the levers 91 and 93.

The operation of the mechanism shown and described in Figures 4 and 5 is also similar to that shown and described in Figures 1, 2, and 3. When the brake pedal 12 is depressed, pressure is applied to the fluid in the master cylinder 10 and is transmitted hydraulically with equal pressure to the operating cylinders 83 and 84. The pistons in these cylinders are forced outwardly and the levers 91, 92, 93, and 94 are rocked to tension the rods 102, 103, 104, and 105 and apply the brakes. When the hand lever 106 is operated, the levers 109 and 112 are rocked and through the shaft 95 and the cross member of the arm 113 rock the levers 91 and 93 to apply the rear brakes, the upper ends of the levers 91 and 93 moving away from the heads of their associated pistons. When the brakes are applied in the ordinary way by the pedal the lower ends of the levers 91 and 93 move away from the cross-member of the arm 113 without affecting the hand lever.

Having now particularly described and ascertained the nature of my said invention and in what manner the same is to be performed, I declare that what I claim is:

A brake system for a vehicle comprising brakes; a brake pedal; a master cylinder connected to said brake pedal; operating cylinders located at convenient points on said vehicle frame; means for transmitting pressure hydraulically from said master cylinder to said operating cylinders; means including a shaft and a lever rotatably mounted on said shaft, for transmitting pressure mechanically from said operating cylinders to said brakes; a hand lever; a T-lever mounted on said shaft for movement of rotation and having its cross portion of said first named lever; and means connecting said hand lever and said T-lever.

HERBERT CLARK.